INVENTORS
ALFRED H. WALZ &
ROBERT OSTREICHER
BY Young, Emery & Thompson
ATTORNEYS

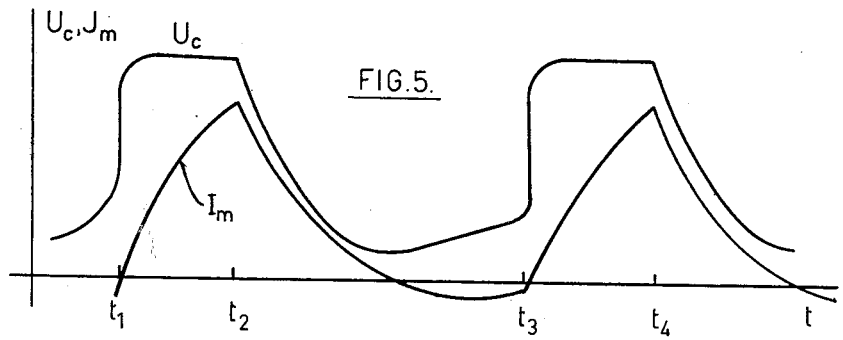
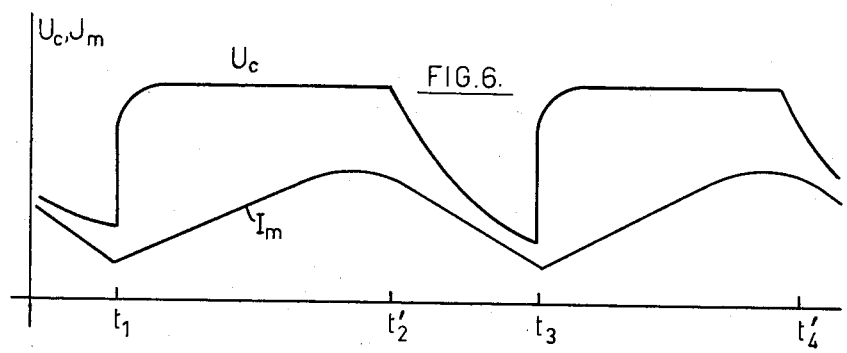
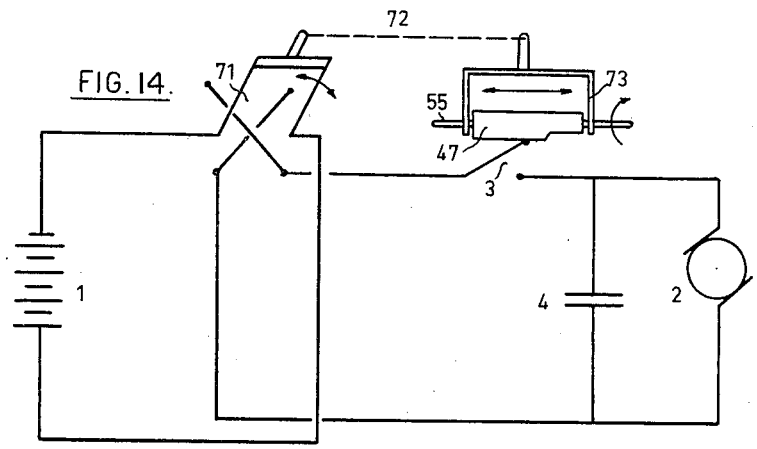

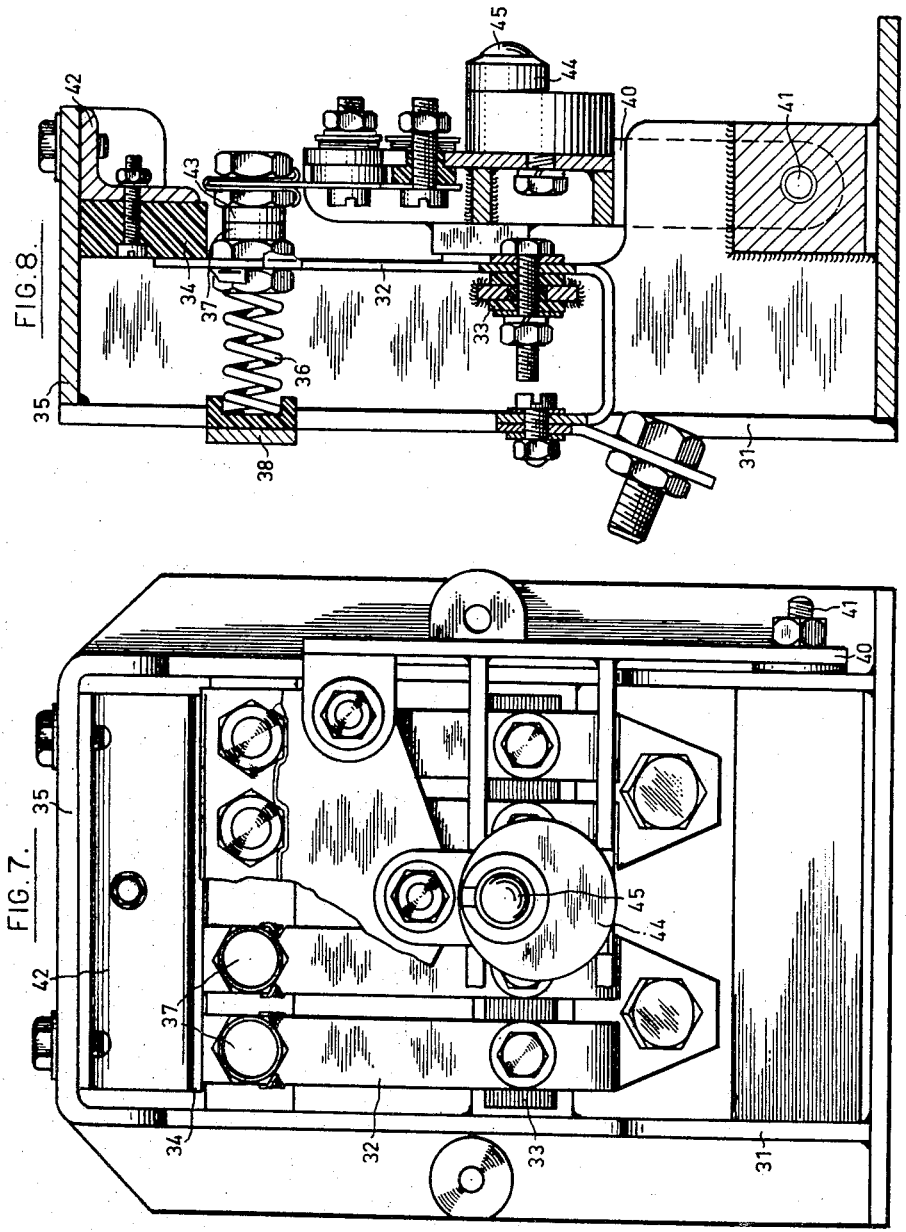

Nov. 13, 1962 A. H. WALZ ET AL 3,064,176
SWITCHING ARRANGEMENT FOR THE REGULATION OF
D.C. MOTORS WITHOUT LOSSES
Filed Aug. 26, 1955 5 Sheets-Sheet 4
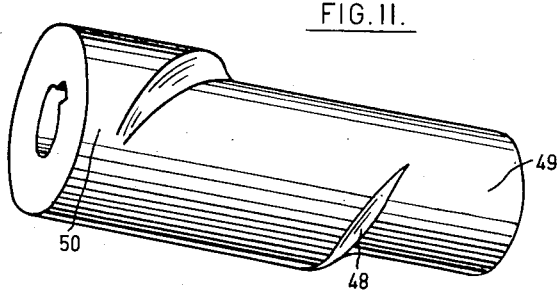
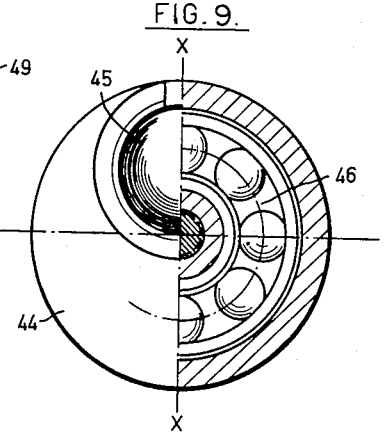
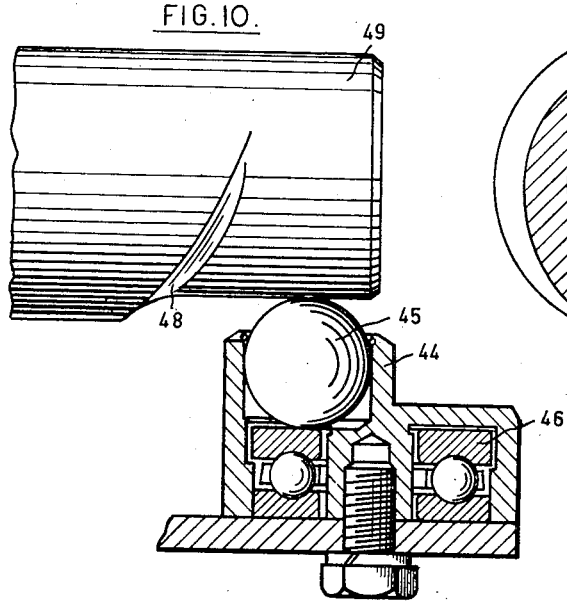
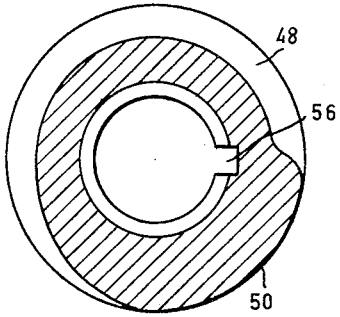
INVENTORS
ALFRED H. WALZ &
ROBERT OSTREICHER
BY
Young, Emery & Thompson
ATTORNEYS

United States Patent Office 3,064,176
Patented Nov. 13, 1962

3,064,176
SWITCHING ARRANGEMENT FOR THE REGULATION OF D.C. MOTORS WITHOUT LOSSES
Alfred H. Walz, Am Kurzarm 7, Emmendingen, Baden, Germany, and Robert Ostreicher, Haus 272, Freiamt, Reichenbach, Baden, Germany
Filed Aug. 26, 1955, Ser. No. 530,680
Claims priority, application Germany Aug. 31, 1954
16 Claims. (Cl. 318—346)

The invention relates to a switching arrangement for regulating free from losses the input of an electric motor fed from a source of direct current, and, in particular, to the power regulation of an electric trunk fed by an accumulator battery.

Switching arrangements are known for regulating without losses the input of an electric motor fed by a source of direct current, for which a rotary switch is provided which is adjustable for regulating the timing of the contact-making in relation to that of the contact-breaking. In switching arrangements of this type the question of freedom from sparking of the periodic switch and also the question of the quiet running of the motor, in particular the smooth, steady starting up of the motor, are important factors.

Both questions depend upon the conditions of energy storage in the electric current passing through the rotary breaker for switching on to the source of direct current; that is, substantially, how great the self-induction of the motor and the effective capacity extending parallel to the electric circuit of the motor are.

According to the invention a branch, composed substantially of a capacity, is arranged parallel to the branch which includes the motor to be regulated and which for switching on is connected to the source of direct current by a circuit-breaker. It is important for the satisfactory operation of the arrangement for the branch containing the motor to have a sufficiently great inductive resistance component.

If necessary, when the self-induction of the motor is not sufficiently great, an additional self-induction is arranged in series with the motor so that the above mentioned capacitative branch lies parallel to this series-connection between electric motor and self-induction.

Preferably, but not necessarily, another self-induction is arranged in the charging current circuit of the condenser, which, on the closing of the adjustable periodic switch, is charged from the supply of direct current voltage potential, the inductive resistance of said self-induction must, however, be small as compared with the inductive resistance of the branch of the arrangement forming the consumer circuit proper and containing the electric motor.

The manner of operation and dimensions of the two parallel branches are indicated in the following description: If a direct current motor is switched on, a very strong current flows through it as long as it is stationary and no compensating or serious resistance is employed. Only when the motor is running is a counter voltage formed which prevents the occurrence of too heavy currents. In order to prevent the occurrence of excessively strong starting up current it is possible, instead of using a starting resistance which necessarily means loss of energy, to limit the starting up current by using motors with a suitably high inductivity or to connect in circuit a self-induction for the motor. The invention employs this last mentioned basic principle but, in dimensioning the inductive resistance components of the electric circuit containing the motor, the intermittent operation of the switching arrangement must be taken into consideration.

The inductive resistance components of the branch containing the electric motor are, in a switching arrangement according to the invention, so dimensioned that the effective current flowing through the motor when the motor is stationary and the switch is set to the shortest contact-making time, is not considerably greater than the maximum permissible permanent current of the motor, that is, for example, between half and twice the maximum permissible continuous flow of current.

Compliance with this dimensional rule is important in order to prevent overloading of the motor.

It is also important that the rate of discharge of the parallel-connected condenser is slowed down during the circuit-breaking phases of the switch; a complete discharge thereof takes place only in the event of setting to the shortest adjustable contact-making time. By complying with this requirement it is possible to produce a smooth, steady starting up of the motor.

The dimensioning of the capacitative parallel branch is also of importance for avoiding sparks at break on the switch; as a result of the inductive resistance of the branch containing the motor, the current at contact-break has the tendency to flow on, which, provided the current cannot flow in with a sufficiently large capacity, leads to overvoltages and spark formation. The condenser must be capable of allowing the accumulated charge to drop only so slowly, when the contact path of the switch is interrupted, that the broken contacts have moved sufficiently far apart that the dropping condenser voltage and the difference in voltage between the contacts resulting therefrom, cannot lead to spark formation.

The condenser also causes the charge accumulated in the switch to continue to supply driving energy to the motor when the switch is open, with the result that the motor runs smoothly. On the other hand, the condenser presents the danger that, when the switch makes contact, an excessively heavy current surge occurs in the condenser. This danger is reduced by the use of a self-induction series-connected in the charging circuit of the condenser; in selecting the dimensions of this condenser it is, however, necessary to see that complete charging of the condenser is ensured even when the switch is set for the shortest contact-making time.

It is desirable from the point of view of price and weight, to use an electrolytic condenser. Such condensers are susceptible to current overloading but the use of current-limiting means also constitutes a protection of the condenser in this respect.

The danger of the formation of sparks at break on the switch makes it necessary to use a quick contact breaking switch. The invention therefore also includes the constructional design of such a switch.

The invention is illustrated in the fourteen figures of the accompanying drawings in which:

FIGS. 5 and 6 are charts showing by way of example the time curve of the current flowing through the motor and the voltage forming on the condenser;

FIG. 7 is a side elevation of another form of switch;

FIG. 8 is a vertical cross section of switch of FIG. 7;

FIG. 9 is a front view partly in section of a detail of the control element;

FIG. 10 is a sectional view of the control element and showing in side elevation of a cam shaft;

FIG. 11 is a perspective view of the cam shaft;

FIG. 12 is a cross section of the cam shaft;

FIG. 14 is a wiring diagram.

Figure 1:
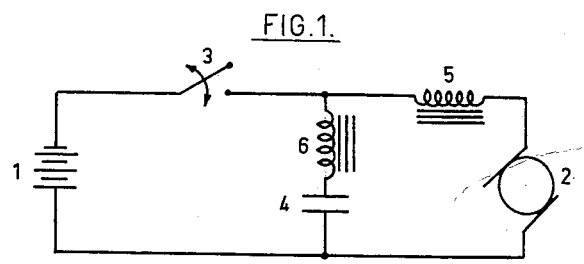
FIG. 1 and 2 are circuit diagrams of two special forms of construction.

The references in the figures have the following significance:

1 is the source of direct current voltage, preferably an accumulator battery. 3 is a periodically operating switch the making and breaking-time ratio of which is adjustable; 3 being preferably a rotary switch. 2 is the motor the input of which is to be regulated; for example the driving motor of an electric truck. 4 is a condenser, preferably an electrolytic condenser which is charged during the closing or contact making phases of the periodic switch 3 and gives up the same capacity to the motor 2 during the opening or breaking phases. Spark formation during the opening of the switch 3 is to a great extent eliminated by the condenser 4. A self-induction 5 it shown in series-connection with the motor 2. The self-induction 5, indicates the inductive resistance component of the branch containing the motor, it is located to least partly but possibly entirely in the motor. So as to prevent to heavy charging currents occurring in the condenser 4 another self-induction 6 is provided in the charging circuit of the condenser 4 and its self-induction valve is small in proportion to the self-induction value 5. Under certain circumstances the self-induction 6 may be an air-core coil composed of only a few windings. It is, however, specifically mentioned this additional self-induction 6 is not absolutely necessary and may, if desired, be omitted entirely provided the current strength of the switch or condenser used will allow this.

Figure 2:
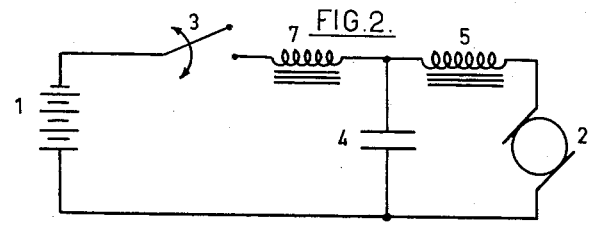

The embodiment of the invention illustrated in FIG. 2 differs from that shown in FIG. 1 in the arrangement of the additional self-induction in the charging circuit of the condenser, so that the current flowing through the motor 2 also flows through a self-induction 7.

Figure 3:
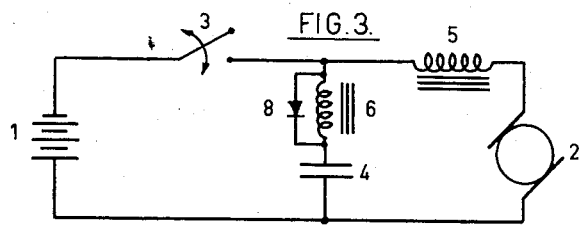
FIGS. 3 and 4 are circuit diagrams showing two further arrangements.

To reduce the possibility of an inadmissibly high charging current in the condenser 4 and at the same time not to impair the charging thereof by the self-induction 6, a dry rectifier 8 may be provided parallel to 6, as shown in FIG. 3.

Figure 4:
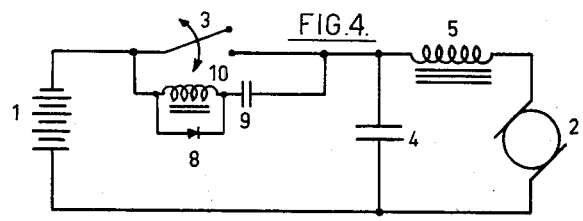
Figure 13:
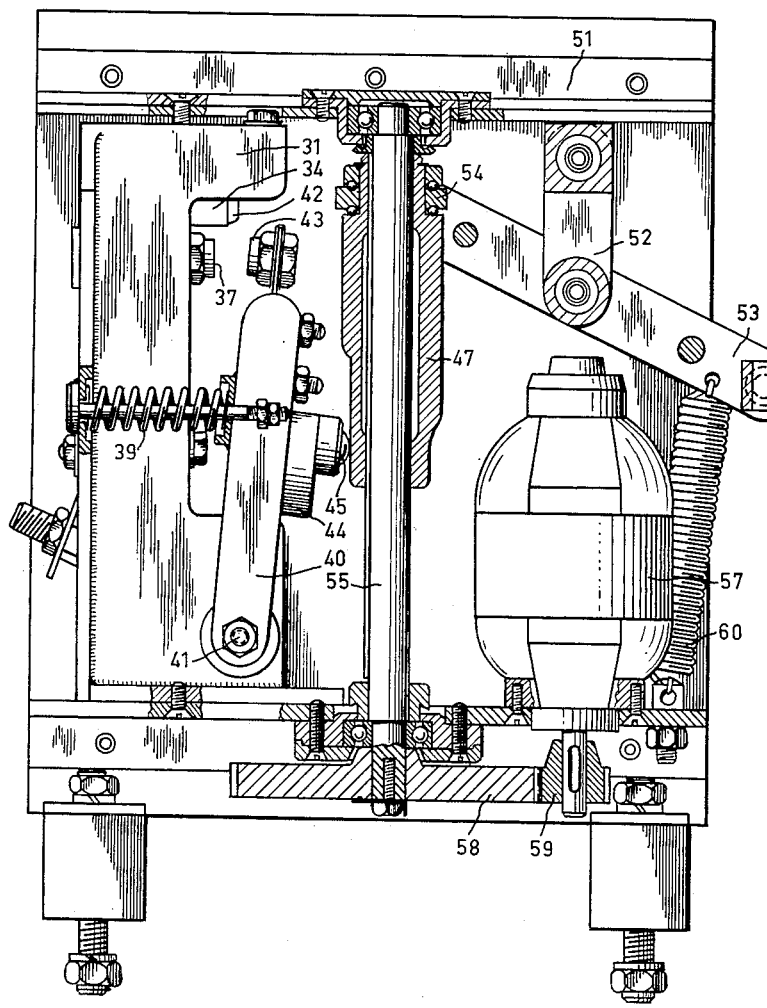
FIG. 13 is a side elevation partly in section showing the complete switching arrangement.

By the parallel connection of the self-induction or choke 6 and the rectifier 8, the charging of the condenser through the choke coil when the switch 3 is closed or in contact-making position, takes place only slowly with weak currents which are not dangerous for the condenser 4 and the switch, whereas, when the switch opens or breaks contact the charge of the condenser can again discharge into the motor 2 over the rectifier 8. Moreover, as shown in FIG. 4, a condenser 9 parallel to the switch can be connected in series with the rectifier 8 or with a parallel connection of a rectifier with a self-induction 10. A resistance may also be provided in series with the condenser 9. Such a circuit arrangement assists the suppression of sparks at break on the switch 3.

The following is also mentioned concerning the function of the circuit arrangement and the dimensioning of the switch elements: The size of the condenser 4 is preferably so selected that, in the case of a battery voltage of 80 volts and contact making times and breaking frequencies hereinafter mentioned, it has a capacity of about 2000 to 3000 $\mu$F per motor H.P. output. With a voltage $n$-times smaller the condenser 4 must be greater by the factor $n^2$.

The switch is preferably a rotary switch, the switching frequency of which is at least about 10 Hertz and the shortest contact-making period about $\frac{1}{10}$ of the time in which the contact-making intervals recur. The rotating switch is one comprising an oscillatable switching arm and a rotatable controlling cam member which cam member is mounted axially slidable on a motor-driven shaft. The breaking frequency of the switch preferably lies between 10 and 20 Hertz. The object of the resistance component 5 is to damp the current surge in the motor as the switch closes and also to slow down the discharge of the condenser 4; It may happen that, when the arrangement is set for the shortest possible contact-making time, the condenser 4 is almost completely discharged during the switching intervals. The size of the self-induction 6 must be so chosen that, even during the shortest contact-making period of the rotary switch 3, an almost complete charging of the condenser 4 takes place. On the other hand the induction resistance component 5 should allow a discharge of the condenser 4 only in a period which is considerably greater than the shortest contact making period of the switch.

Under certain circumstances it may be advisable to increase the switching frequency of the switch 3 when regulating to lower output. Such a regulation which may be effected in a simple manner by reducing the speed of rotation of the auxiliary motor operating the switch, produces smooth running of the motor 2 even when adjusted to the smallest output stage.

The condenser 4 is preferably constructed as a switch-proof electroyltic condenser with barrier layers on its two plates.

FIG. 5 and 6 show two oscillograms which were obtained in different stages of regulation with a switching arrangement according to the invention in which the motor was braked with about its rated power.

The abscissa is the time axis; $U_c$ indicates the lapse of the voltage developing on the condenser 4; $I_m$ indicates the lapse of the current flowing through the motor. From the time phase of the voltage developing on the condenser it can be seen that the charging of the condenser to full battery load is practically instantaneous when the switch makes contact (points of time $t_1$, $t_3$). At the point where the current is interrupted $t_2$, $t_4$—$t_{2'}$, $t_{4'}$ the voltage of the condenser $U_c$ drops, a slight tendency to swing being noticeable in the oscillogram shown in FIG. 5. The current curve $I_m$ in the example illustrated in FIG. 5, shows a steep current rise during the contact-making times $t_1 \ldots t_2$, whereas the current drops to a slightly negative value during the time of current interruption $t_2$, $t_3$. In the oscillogram shown in FIG. 6 the current $I_m$ attains a saturation value during the time of contact $t_1 \ldots t_{2'}$, from which it drops to a somewhat lower value during the phases of interruption $t_{2'}$, $t_3$. In this instance there is no zero flow of the current $I_m$, so that the voltage curve $U_c$ likewise does not pass through any minimum value as in the case of FIG. 5.

It is important that the voltage $U_c$ should drop as slowly as possible at the commencement of the period of current interruption $t_{2'} \ldots t_3$ and $t_2 \ldots t_3$ respectively. At the points of time $t_2$ and $t_{2'}$ respectively the two contacts of the switch 3 have the same potential and it is important for the contacts to have already moved as far as possible apart before the condenser voltage $U_c$ has dropped considerably and therefore a considerable voltage prevails on the open contacts of the switch 3. The drop in condenser voltage $U_c$, which can be seen from FIGS. 5 and 6, takes place in this sense sufficiently slowly.

Experiments have shown that, in order to avoid the formation of a light arc on the contacts in the process of breaking, it is necessary that the voltage difference on the contacts shall not exceed the dimension of 10 volts when the contact-breaking has brought about an interruption of the contact path which is less than 1 mm. This means that about 1 m.sec. after the commencement of the breaking of the contacts of the switch, the voltage of the condenser 4 may only have dropped by less than about 10 volts.

It is advisable that the closed electric circuit consisting of the condenser 4 and the electric motor branch 2 be periodically damped during the phase of current interruption, as shown in FIG. 6; if the motor current were to swing over to considerable negative current directions during the break of current of the switch, the result would be that, when the switch again closes, a particularly strong change in the motor current would occur which would make itself apparent by an undesirable torque impulse on the motor.

It has been found that with switching arrangements according to the invention it is apparently important for the contact breaking operation of the circuit-breaker to be carried out as quickly as possible so that, when the contact is broken, the contact pieces of the breaker have moved apart a considerable distance before a relatively large difference in voltage has developed at the open contact points of the switch due to the discharge of the condenser.

On the other hand, a relatively slow speed can be chosen for the closing of the contact without any disadvantage. Otherwise care must be taken that, during the opening of the switch contact element, no undesirable chattering occurs which would result in repeated contact-making due to the vibration of the contact element.

Details of the switch construction are illustrated in FIGS. 7 to 14.

As can be seen from FIGS. 7 and 8 current conducting contact laminations 32 are fixed on a bridge 33 of insulating material on a metal frame 35. At one end of the metal frame 35 a bar 34 of insulating material is mounted by means of a metal angle bracket 42 against which bar the contact laminations 32 strike resiliently in upward direction. The spring force of the laminations is supplemented by spiral springs 36 so that the material chosen for the resilient laminations may have low resilient properties but possess greater conductivity. Tungsten contacts 37 are provided on the ends of the spring laminations 32. Each two laminations 32 are connected in parallel but insulated against the metal frame 35. Consequently the spiral springs 36 also bear against a bridge 38 of insulating material fixed on the metal frame 35.

The bridging member 40 (hereinbefore designated by 10) is hinged on the metal frame 35 by means of an axle 41. The bridging member 40 has tungsten contacts 43 which correspond with the contacts 37 of the contact springs 32 and establish an electric connection between the pairs of contact springs.

The bridging member 40 is subjected to the pressure of two spiral springs 43 the force of which presses it into the contact breaking position. A control element shown in greater detail in FIGS. 9 and 10 and composed of a ball 45 with box-shaped mounting 44 is provided as control finger 13. The ball 45 runs on the runner race 46 of an axial ball bearing provided inside the mounting 44. Thus the ball 45 is easily rotatable in directions perpendicular to the section line X—X because the inner race 46 of the ball can participate in the rotary movement. The ball 45 rolls like a control finger on the tube acting as cam disc whereby the axis of rotation of this tube must be considered as extending in the direction of the line X—X, that is parallel to the longitudinal direction of the contact springs 32.

FIG. 11 shows the cam shaft coordinated thereto which must be considered as arranged axially shiftable on the shaft and, cooperating with the ball constituting the feeler finger of the actuated element of the switch, effects the contact-making and breaking of the bridging member 40. The cam shaft consists of a cylindrical body 47 the end 49 of which is of smaller diameter than the other end 50. A shoulder or step 48 is formed in the shape of a screw thread winding about the body and effects the contact-breaking operation of the controlled switch. As the cylindrical body 47 turns about its longitudinal axis the switch is maintained in closed or contact making position as long as the ball 45 runs on the portion of the periphery of the body 47 which corresponds to the greater diameter of the end 50. If as the body 47 rotates the ball runs down the step 48 the switch is opened or breaks contact and when it subsequently runs on to the portion of the periphery which corresponds to the smaller diameter of the end 49, the switch is held in its contact-breaking position. The contact-making or closing movement of the switch takes place slowly because, viewed in a cross-sectional plane, the cylindrical body is of the shape shown in FIG. 12.

The electrical part of the switch arrangement which is illustrated in FIGS. 7 to 11 forms a separate constructional group which is inserted in a frame 51 which forms the mechanical controlling part of the switch arrangement.

The construction of the electrical part of the switch arrangement which is described as a separate constructional group in FIGS. 7 to 11, possesses the advantage that the part which is subjected to the heaviest mechanical wear can be exchanged in a simple manner.

The mechanical controlling part of the switch arrangement comprises a strap 52 on the frame 51, a control lever 53 being rotatably mounted on the strap 52 and stressed by a tension spring 60. A ring 54 is rotatably mounted on the cylindrical cam body 47 and engages the free end of the control lever 53 in such a manner that, when the control lever 53 swings, the body is shifted axially on the driving shaft 55. The shaft has an axially extending rib which engages in a corresponding groove 56 (FIG. 12) of the body 47 acting as controlling cam so that the latter is connected in the direction of rotation with the driving shaft 55, while ensuring axial displacement. The shaft 55 is driven by an electric motor 57 through the intermediary of two gear wheels 58 and 59.

It is known that mechanical contact-making devices which repeatedly effect the switching on operation of a D.C. current and the switching off operation thereof, are subjected to asymmetrical wear in that the D.C. current allows a creeping of the contact material to take place.

On this account it is advisable to provide in the electric circuit a commutator which causes a reversal of the current direction for example every time the switching off of a periodically operating switch is carried out by shifting the control lever 53 into its switching off position.

A circuit diagram of such a design for a switching arrangement according to the invention is illustrated in FIG. 14, in which, as in FIG. 1, the battery is designated by 1, the regulating D.C. motor by 2, the condenser by 4 and the switching path by 3. The axially shiftable cam body controlling the contact laminations of the switch 3 is designated by 47, its driving shaft by 55 and the element corresponding to the control lever 53 of FIG. 13 by 73. The commutator 71 is provided in the feed circuit of the battery 1. The commutator 71 is mechanically connected with the actuating element 73 of the cam body 47, as indicated by the dash line 72. The connecting member 72 includes a mechanical stepped switching mechanism which, each time the control element 73 is pushed into its extreme position to the left, causes a pole reversal of the commutator. The mechanical construction of such a coupling can be effected in various ways.

Details of the design according to the invention of an electric truck regulating arrangement are hereinafter set forth. The invention was tried out on three electric trucks of Messrs. Miag and Still respective. The impedances employed on the Miag seat-type truck and the Still seat-type truck "Kuli," like the choke 5 of FIG. 1, had reaction cores which corresponded to the DIN standards 46 400 and 41 302, and coil body to the DIN standard 41 303.

TABLE

| Electric trucks —Type Data | Miag seat-type trucks | Still seat-type trucks | Still seat-type trucks "Kuli" |
|---|---|---|---|
| Power, H.P. | 4.9 | 3.3 | 1.1. |
| revolutions per minute of motor. | 690 | 2,500 | 3,700. |
| Battery voltage, Volts. | 80 | 80 | 24. |
| Capacity μF. per H.P. | 2,450 | 2,700 | 21,000. |
| series choke | DIN 550/150 40 windings dynamo wire 4.2 mms. φ core plate: Dine sheet III e i 150 x 0.5 core body: e l 150 e. | | DIN 250/130 80 windings enamelled wire 3.5 mms. φ. core plate: dine sheet III e i 130 x 0.5 core body: e l 130 a. |
| switch frequency, Hertz. | 10 | 10 | 10. |

The method of switching described in connection with FIG. 14 which provided pole reversal of the current feeding the electric motor, can also be such that the pole reversal is effected on the driving motor being switched over to reverse. Especially in the case of so-called fork stackers which have a lifting fork for lifting crates and the like, a switching over of the driving motor frequently takes place so that when the commutator is controlled by the switch-over device to the reverse of the motor, a practically uniform drive of the periodically operating switching device of the plant occurs, with opposite current directions.

It must be pointed out that when in the foregoing description mention is made of the "shortest" time of contact-making of the periodically operating switch, this means a switching time which corresponds approximately to 10% of the period duration of the periodic switching operations of the switching device.

We claim:

1. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, and an inductive resistance component of the branch containing the motor connected in parallel to the condenser and during the periods of break of the switch the discharge of the condenser is retarded and the complete discharge thereof is only possible when the arrangement is set for the shortest contact-making time.

2. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, and a self-induction of the branch containing the motor connected in parallel with the condenser and when the motor is not running, the effective value of the motor current, resulting for a period of the switch set for the shortest contact-making time, does not considerably exceed the permissible permanent current.

3. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, and an additive induction provided in the branch containing the motor and connected in parallel with the condenser.

4. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, a charging electric circuit for the condenser, and an additive self-induction in the charging electric circuit of the condenser and having a self-inductive value which is small as compared with the self-induction of the branch containing the motor.

5. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, the electrolytic condenser being arranged parallel to a contact path of the switch, and current-restricting means in series with the condenser to prevent the occurrence of undesirably heavy condenser currents on contact-making.

6. Circuit arrangment for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu f$ per motor H.P. rating and when the operating voltage of the motor is $80/n$ volts where $n$ is an arbitrary number and the capacitance of which is at least $n^2$ times $2000/\mu f$ per motor H.P., and the rotating switch interrupting with the frequency of 10–20 c.p.s. is provided with the controlling cam having a sloping closing shoulder and a steep opening shoulder, the electrolytic condenser being parallel to a contact path of the switch, and a self-induction connected in series with the condenser to prevent the occurrence of undesirably heavy condenser currents on contact-making.

7. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu f$ per motor H.P. rating and when the operating voltage of the motor is $80/n$ volts where $n$ is an arbitrary number and the capacitance of which is at least $n^2$ times $2000/\mu f$ per motor H.P., and the rotating switch interrupting with the frequency of 10–20 c.p.s. is provided with the controlling cam having a sloping closing shoulder and a steep opening shoulder, at least one electrolytic condenser being arranged in parallel to the contact path of the switch, and current-limiting means in series with the condenser and bridged by a rectifier offering slight resistance to the condenser current when the contact section is open and high resistance when it is closed.

8. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu f$ per motor H.P. rating and when the operating voltage of the motor is $80/n$ volts where $n$ is an arbitrary number and the capacitance of which is at least $n^2$ times $2000/\mu f$ per motor H.P., and the rotating switch interrupting with the frequency of 10–20 c.p.s. is provided with the controlling cam having a sloping closing shoulder and a steep opening shoulder, an additional self-induction being provided in the branch containing the motor, and a rectifier preventing high resistance to the charging current arranged parallel with the self-induction connected in the condenser circuit.

9. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu f$ per motor H.P. rating and when the operating voltage of the motor is $80/n$ volts where $n$ is an arbitrary number and the capacitance of which is at least $n^2$ times $2000/\mu f$ per motor H.P., and the rotating switch interrupting with the frequency of 10–20 c.p.s. is provided with the controlling cam having a sloping closing shoulder and a steep opening shoulder, a rotary circuit breaker with contact-making and breaking times adjustable relatively to the period of rotation, a driving axle for the circuit breaker, a tube for the circuit breaker axially slidable on said driving axle and constituting an adustable cam with variable cam length, a contact device controlled by said tube, and a switch comprising a member bridging the contacts of the contact device with a finger on said bridging member controlled by the axially slidable tube.

10. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu f$ per motor H.P. rating and when the operating voltage of the motor is $80/n$ volts where $n$ is an arbitrary number and the capacitance of which is at least $n^2$ times $2000/\mu f$ per motor H.P., and the rotating switch interrupting with the frequency of 10–20 c.p.s. is provided with the controlling cam having a sloping closing shoulder and a steep opening shoulder, a rotary circuit breaker with contact-making and breaking times adjustable relatively to the period of rotation, a driving axle for the circuit breaker, a tube for the circuit breaker slidable on said driving axel and constituting an adjustable cam with variable cam length, a contact device controlled by said tube, and a switch mounted on a metal frame having contact springs insulated on said frame and connected in groups and a controlled oscillatably mounted bridging member conductively connecting said springs.

11. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately 2000 $\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, a rotary circuit breaker with contact-making and breaking times adjustable relatively to the period of rotation, a driving axle for the circuit breaker, a tube for the circuit breaker axially slidable on said driving axle and constituting an adjustable cam with variable cam length, a contact device controlled by said tube, and a switch mounted on a metal frame having contact springs insulated on said frame and connected in groups and a controlled oscillatably mounted bridging member conductively connecting said springs, the free ends of the contact springs being supported on the metal frame by insulated spiral springs.

12. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, a rotary circuit breaker with contact-making and breaking times adjustable relatively to the period of rotation, a driving axle for the circuit breaker, a tube for the circuit breaker slidable on said driving axle and constituting an adjustable cam with variable cam length, a contact device controlled by said tube, and a switch mounted on a metal frame having contact springs insulated on said frame and connected in groups and a controlled oscillatably mounted bridging member conductively connecting said springs, said bridging member being in the form of a control finger as a rotatably mounted steel ball.

13. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, a rotary circuit breaker with contact-making and breaking times adjustable relatively to the period of rotation, a driving axle for the circuit breaker, a tube for the circuit breaker slidable on said driving axle and constituting an adjustable cam with variable cam length, a contact device controlled by said tube, and a switch mounted on a metal frame having contact springs insulated on said frame and connected in groups and a controlled oscillatably mounted bridging member conductively connecting said springs, the tube consisting of a cylindrical body having a step extending in the form of a screw thread once around its periphery inwards with the end having the smaller diameter.

14. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder.

15. Circuit arrangement for the control of a direct current electric motor especially for the control of the motor of an electirc truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, the steeply descending contact opening edge of the cam device merging smoothly into the inclined ascending contact closing shoulder.

16. Circuit arrangement for the control of a direct current electric motor especially for the control of the motor of an electric truck wherein a switch having an oscillatable switching arm and a rotatable controlling cam member which is axially shiftable and utilized as control means with the ratio between the duration of the period when the contacts of said switch are open and the duration of the period when the said contacts are closed being adjustable, comprising an electrolytic condenser connected in parallel to the motor, the capacitance of said condenser, when the operating voltage of the motor is 80 volts, is at least approximately $2000/\mu F$ per motor H.P. rating and when the operating voltage of the motor is $80/n$ volts where $n$ is an arbitrary number and the capacitance of which is at least $n^2$ times $2000/\mu F$ per motor H.P., and the rotating switch interrupting with the frequency of 10–20 c.p.s. is provided with the controlling cam having a sloping closing shoulder and a steep opening shoulder, and means for regulating the frequency of the periodically operating switch to higher breaking times to set it to lower power consumption of the condenser when regulating the switching operation.

References Cited in the file of this patent

UNITED STATES PATENTS

| | | |
|---|---|---|
| 720,729 | McDonnell | Feb. 17, 1903 |
| 1,362,844 | Cardoza | Dec. 21, 1920 |
| 1,761,775 | Carter | June 3, 1930 |
| 2,032,444 | Schwarz | Mar. 3, 1936 |
| 2,357,285 | Potts | Sept. 5, 1944 |
| 2,440,228 | Yardeny et al. | Apr. 20, 1948 |
| 2,502,967 | Leathers et al. | Apr. 4, 1950 |
| 2,520,492 | Colegrove | Aug. 29, 1950 |
| 2,631,265 | Colegrove | Mar. 10, 1953 |